(12) United States Patent
Wang et al.

(10) Patent No.: US 8,305,063 B2
(45) Date of Patent: Nov. 6, 2012

(54) POWER SUPPLY CONTROLLER WITH AN INPUT VOLTAGE COMPENSATION CIRCUIT

(75) Inventors: Zhao-Jun Wang, San Jose, CA (US); Giao M. Pham, Milpitas, CA (US)

(73) Assignee: Power Integrations, Inc., San Jose, CA (US)

( * ) Notice: Subject to any disclaimer, the term of this patent is extended or adjusted under 35 U.S.C. 154(b) by 595 days.

(21) Appl. No.: 12/550,268

(22) Filed: Aug. 28, 2009

(65) Prior Publication Data

US 2011/0050188 A1 Mar. 3, 2011

(51) Int. Cl.
*G05F 1/56* (2006.01)
(52) U.S. Cl. ......... 323/283; 323/222; 323/285; 323/299
(58) Field of Classification Search ................. 323/222, 323/283, 284, 285, 299
See application file for complete search history.

(56) References Cited

U.S. PATENT DOCUMENTS

| | | | | |
|---|---|---|---|---|
| 7,095,215 B2 * | 8/2006 | Liu et al. | | 323/222 |
| 7,279,878 B2 * | 10/2007 | Ootani et al. | | 323/285 |
| 7,397,678 B2 * | 7/2008 | Frank et al. | | 363/89 |
| 7,425,819 B2 * | 9/2008 | Isobe | | 323/222 |
| 7,834,608 B2 * | 11/2010 | Cheng et al. | | 323/299 |
| 7,876,073 B2 * | 1/2011 | Sohma | | 323/222 |
| 7,888,917 B2 * | 2/2011 | Olson | | 323/222 |
| 8,102,165 B2 * | 1/2012 | Gu et al. | | 323/285 |
| 2003/0001551 A1 | 1/2003 | Daniels et al. | | |
| 2004/0252532 A1 | 12/2004 | Lee et al. | | |
| 2011/0050188 A1 * | 3/2011 | Wang et al. | | 323/282 |

FOREIGN PATENT DOCUMENTS

EP 1 650 857 A2 4/2006

OTHER PUBLICATIONS

EP 10 17 4391—European Search Report, dated Dec. 2, 2010. (3 pages).
O'Loughlin, M., "Simple Circuitry Gets That Old PFC Controller Working in A Boost-Follower PFC Application," Applications Engineering, Texas Instruments Limited, Website: http://www.analogzone.com/techmain.htm indicates date of Oct. 20, 2003, 6 pages.
O'Loughlin, M., "Boosting Efficiency in Off-Line Power Converters," Power Electronics Technology, May 2008, pp. 30-33.
"AN-8021 Building Variable Output Voltage Boost PFC Converters with the FAN9612 Interleaved BCM PFC Controller," Fairchild Semiconductor Corporation, Rev. 1.0.1, 2009, pp. 1-13.
EP 10 17 4391—European Office Action, dated Jan. 20, 2011 (6 pages).

* cited by examiner

*Primary Examiner* — Jeffrey Sterrett
(74) *Attorney, Agent, or Firm* — Blakely Sokoloff Taylor & Zafman LLP

(57) ABSTRACT

An example controller for a power supply includes a drive signal generator and a compensation circuit. The drive signal generator is to be coupled to control switching of a switch included in the power supply to regulate an output voltage of the power supply in response to a sensed output voltage such that the output voltage of the power supply is greater than an input voltage of the power supply. The compensation circuit is coupled to the drive signal generator and is also coupled to output an offset current to adjust the sensed output voltage in response to the input voltage of the power supply.

24 Claims, 5 Drawing Sheets

POWER SUPPLY CONTROLLER WITH AN INPUT VOLTAGE COMPENSATION CIRCUIT

TECHNICAL FIELD

The present invention relates generally to power supplies, and more specifically to power supplies having an output voltage greater than an input voltage.

BACKGROUND INFORMATION

When designing electronic equipment, regulatory agencies have set several specifications or standards which should be met. The electrical outlet provides an ac voltage that has a waveform conforming to standards of magnitude, frequency and harmonic content to electrical equipment. However the current drawn from the outlet is determined by the characteristics of the electrical equipment which receives the ac voltage. Regulatory agencies set standards for particular characteristics of the current that may be drawn from the ac electrical outlet. For example, a standard may set limits on the magnitudes of specific frequency components of the ac current. In another example, a standard may limit the rms value of the current in accordance with the amount of power which the outlet provides. One standard places limits on the power factor correction (PFC) which should be included for electronic devices, such as for example the International Electrotechnical Commission (IEC) standard IEC 61000-2-2. Power factor is particularly important for power distribution systems. When electronic equipment (such as a power supply) has less than unity power factor, power utilities would need to provide the electrical equipment with more current than electrical equipment with unity power factor. By employing PFC, power utilities may avoid the need for extra capacity to deliver current.

The power factor is the ratio of the average power over a cycle to the product of the root mean square (rms) voltage and the rms current. The power factor has a value between zero and one with unity power factor as the ideal case. Generally, a PFC circuit shapes the input current waveform as closely to the input voltage waveform in an attempt to achieve unity power factor.

One example of electrical equipment which may utilize a PFC circuit is a switched-mode power supply. In a typical switched mode power supply, the power supply receives an input from an ordinary electrical outlet. Switches in the power supply are switched on and off by a control circuit to provide a regulated output. Since the power supply which receives the ac voltage determines the characteristics of the ac current, power supplies often use active circuits at their inputs to maintain a high power factor. Conventional power factor corrected power supplies may be designed in two stages. The first stage is the PFC circuit which attempts to shape the input current waveform to achieve unity power factor. The second stage is the switched-mode power supply which provides a regulated output.

In general, a step-up converter may be utilized as a PFC circuit. In particular, a boost power converter may be utilized as a PFC circuit. However, boost converters typically have a fixed output voltage regardless of the value of the voltage delivered by the power utilities, or in other words regardless of the line input voltage. Generally, different countries have different standards for the amount of ac voltage which is delivered. The ac line voltage may vary from 85 to 265 V ac and typical step-up converters utilized for PFC may have an output between 380-400 V dc. However, for countries with lower ac line voltages it may be desirable for the PFC circuit to provide an output voltage less than 380-400 V dc.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
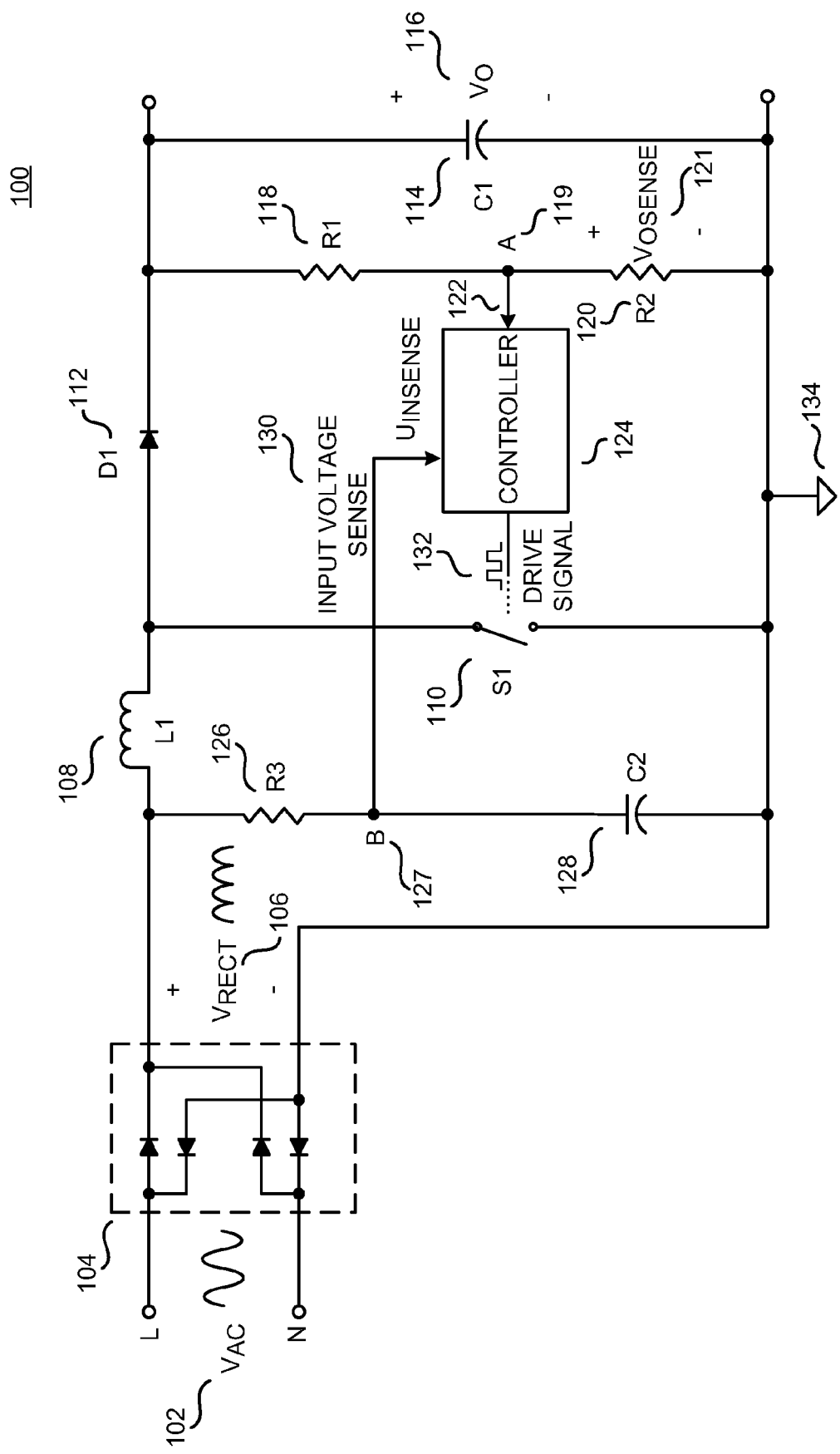
FIG. 1 is a schematic illustrating a power supply in accordance with an embodiment of the present invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

In general, boost converters may be utilized as PFC circuits. However, it should be appreciated that other step-up converter topologies may be utilized with the embodiments of the present invention. In particular, step-up converter topologies which provide output voltage greater than their input voltage may be utilized with embodiments of the present invention. Step up converters, such as the boost converter, traditionally provide a fixed output voltage regardless of the value of the voltage delivered by the power distribution system, or in other words regardless of the ac input line voltage. However, some benefits, such as reduced boost inductor size and lower switching losses, may be gained by utilizing a boost converter whose output voltage varies with the input voltage of the boost converter. Or in other words, the output voltage of the boost converter follows the variations of the peak ac input line voltage. Such a converter is generally known as a boost follower.

A boost follower typically includes a power switch which is controlled by a controller to switch between an on-state and an off-state. In general, a switch that is considered "on" is also known as closed and the switch can conduct current. A switch that is "off" is also known as open and substantially cannot conduct current. The controller may receive various inputs regarding the state of the boost follower, such as information regarding the output voltage supplied by the boost follower, the input voltage of the boost follower, or the desired ratio between the output voltage and the input voltage. Typical controllers of the boost follower typically include a separate terminal for the various inputs mentioned above. Specifically, a typical controller includes one terminal for feedback regarding the output voltage and another separate terminal for the desired ratio between the output voltage and the input voltage.

Generally, different countries have different standards for the amount of ac voltage which is delivered. The power line voltage may vary from 85 to 265 V ac. As mentioned above, some benefits may be gained by utilizing a boost converter whose output voltage varies with the input voltage (also referred to herein as a boost follower) rather than a boost converter with a fixed output voltage. A typical boost converter utilized for PFC may have an output between 380-400 V. However, a boost converter is more efficient when the output voltage of the boost converter is less than or equal to double the input voltage of the boost converter. For countries with lower power requirements, such as Japan or the United States (with an ac input of 140 peak V ac and 160 peak V ac, respectively), it may be desirable to boost (or in other words, increase) the output voltage to less than 380-400 V dc. In one example, it may be desirable to provide an output voltage roughly two times the input voltage. To utilize the boost follower as a PFC circuit for countries with varying power requirements, a separate PFC circuit would be designed for each country since the desired ratio between the output voltage and the input voltage is fixed. However, it is generally undesirable to design a separate PFC circuit for each country with differing requirements. Embodiments of the present invention include a boost converter topology with an adjustable desired ratio between the output voltage and the input voltage, otherwise discussed herein as the step-up ratio or the input-output conversion ratio. In addition, the controller of the boost converter in accordance with embodiments of the present invention also advantageously utilizes a single terminal to both receive feedback and also to set the desired ratio between the output voltage and the input voltage.

Referring first to FIG. 1, a schematic of a power supply 100 is illustrated including an ac input voltage $V_{AC}$ 102, a bridge rectifier 104, rectified voltage $V_{RECT}$ 106, inductor L1 108, switch S1 110, output diode D1 112, output capacitor C1 114, output voltage $V_O$ 116, a feedback circuit (i.e., resistor R1 118, node A 119, and resistor R2 120), sensed output voltage $V_{OSENSE}$ 121, input signal 122, controller 124, resistor R3 126, node B 127, capacitor C2 128, input voltage sense signal $U_{INSENSE}$ 130, drive signal 132, and input return 134. FIG. 1 is one example of a power supply 100 with an adjustable step-up ratio. The example power supply 100 illustrated in FIG. 1 is a boost converter with boost follower capabilities; however it should be appreciated that other converter topologies may be utilized with the embodiments of the present invention.

The power supply 100 provides output voltage $V_O$ 116 from an unregulated input voltage. In one embodiment, the input voltage is an ac input voltage $V_{AC}$ 102. In another embodiment, the input voltage is a rectified ac input voltage such as rectified voltage $V_{RECT}$ 106. As shown, bridge rectifier 104 receives an ac input voltage $V_{AC}$ 102 and produces a rectified voltage $V_{RECT}$ 106. The bridge rectifier 104 further couples to a boost follower, which includes an energy transfer element such as an inductor L1 108, a switch S1 110, an output diode 112 coupled to the inductor L1 108, an output capacitor C1 114, and controller 124. The inductor L1 108 couples to the output of the bridge rectifier 104 and the output diode D1 112. One end of switch S1 110 also couples between the inductor L1 108 and the output diode 112, the other end of the switch S1 110 couples to the input return 134. In one embodiment, the switch S1 110 may be a transistor such as a metal-oxide-semiconductor field-effect transistor (MOSFET). In another example, controller 124 may be implemented as a monolithic integrated circuit or may be implemented with discrete electrical components or a combination of discrete and integrated components. Controller 124 and switch 110 could form part of an integrated circuit that is manufactured as either a hybrid or a monolithic integrated circuit.

Input return 134 provides the point of lowest potential, or in other words the point of lowest voltage with respect to the input for the power supply 100. Output diode D1 112 further couples to the output capacitor C1 114 and the output of the power converter. Resistors R1 118 and R2 120 form a feedback circuit and are coupled across the capacitor C1 114 and the output of the power converter. One end of resistor R1 118 couples to the output diode D1 112 while the other end of resistor R1 118 couples to one end of resistor R2 120. The other end of resistor R2 120 then couples to input return 134. Resistors R1 118 and R2 120 couple together at node A 119. In the illustrated embodiment, node A 119 is a node external to controller 124. The voltage across resistor R2 120 and at node A 119 is known as the sensed output voltage $V_{OSENSE}$ 121.

Controller 124 includes several terminals for receiving and providing various signals. At one terminal, controller 124 is coupled between resistors R1 118 and R2 120 at node A 119 and receives input signal 122. At another terminal, controller 124 is also coupled between resistor R3 126 and capacitor C2 128 at node B 127 and receives input voltage sense signal $U_{INSENSE}$ 130. One end of resistor R3 126 couples to inductor L1 108 while the other end of resistor R3 126 couples to one end of capacitor C2 128. The other end of capacitor C2 128 is then coupled to input return 134. The controller 124 further provides a drive signal 132 to the switch S1 110 to control the turning on and turning off of switch S1 110.

In operation, the power supply 100 provides output voltage $V_O$ 116 from an unregulated input voltage such as ac input voltage $V_{AC}$ 102. The ac input voltage $V_{AC}$ 102 is received by the bridge rectifier and produces the rectified voltage $V_{RECT}$ 106. The power supply 100 utilizes the energy transfer element, which includes inductor L1 108, switch S1 110, output diode D1 112, output capacitor C1 114 and controller 124 to produce a dc output voltage $V_O$ 116 at the output of the power supply. Resistors R1 118 and R2 120 are coupled together as a voltage divider for the output voltage $V_O$ 116. The output voltage $V_O$ 116 is sensed and regulated. In some embodiments, the input signal 122 is a feedback signal representing the output voltage $V_O$ 116. It should be appreciated that the input signal 122 may be a voltage signal or a current signal. Since resistors R1 118 and R2 120 form a voltage divider of the output voltage $V_O$ 116, in some embodiments the input signal 122 is a divided value of the output voltage $V_O$ 116 where the divided value is based upon the ratio between resistors R1 118 and R2 120. The controller 124 utilizes the divided value of the output voltage $V_O$ 116 provided by the input signal 122 to regulate the output voltage $V_O$ 116 to a desired value. In some embodiments, the input signal 122 is the sensed output voltage $V_{OSENSE}$ 121 and includes the divided value of the output voltage $V_O$ 116. As will be further explained, the controller 124 also utilizes the input voltage sense signal $U_{INSENSE}$ 130 to regulate the output voltage $V_O$ 116 to a desired value.

In addition, as will be explained further, the values of resistors R1 118 and R2 120 may also be utilized to set the ratio between the input voltage of the power supply and the output voltage $V_O$ 116, otherwise known as the step-up ratio or the input-output conversion ratio of the power supply 100. In some embodiments, the resistors R1 118 and R2 120 may set the ratio between the peak input voltage of the power supply and the output voltage $V_O$ 116, such that the output voltage $V_O$ is greater than the peak input voltage. In other embodiments, the resistors R1 118 and R2 120 may set the ratio between the average input voltage of the power supply and the output voltage $V_O$ 116, such that the output voltage $V_O$ is greater than the average input voltage. By varying the values of R1 118 and R2 120, the step-up ratio of the power supply 100 may be adjusted. In further embodiments, the peak input voltage may be the peak value of the rectified voltage $V_{RECT}$ 106. Controller 124 also receives the input voltage sense signal $U_{INSENSE}$ 130 representative of the input voltage of the power supply 100. In some embodiments, the input voltage provided by the input voltage sense signal $U_{INSENSE}$ 130 is the peak value of the rectified voltage $V_{RECT}$ 106. In other embodiments, the input voltage provided by the input voltage sense signal $U_{INSENSE}$ 130 is the average value of the rectified voltage $V_{RECT}$ 106. Resistor R3 126 and capacitor C2 128 are utilized to sense the input voltage and to provide the controller with the input voltage sense signal $U_{INSENSE}$ 130. It should be appreciated that the input voltage sense signal $U_{INSENSE}$ 130 may be a voltage signal or a current signal.

As mentioned above, resistor R3 126 and capacitor C2 128 sense the input voltage and provide the controller with the input voltage sense signal $U_{INSENSE}$ 130. In one embodiment, the input voltage sense signal $U_{INSENSE}$ 130 is a current signal and the voltage at the terminal of controller 124 which receives the input voltage sense signal $U_{INSENSE}$ 130 is fixed. In other words, the voltage at node B 127 is fixed. As such, the current through resistor R3 126 is proportional to the rectified voltage $V_{RECT}$ 106 and the capacitor C2 128 is used as a noise filter.

Utilizing the input voltage sense signal $U_{INSENSE}$ 130 and the value of resistors R1 118 and R2 120, the controller 124 determines the desired value which to regulate the output voltage $V_O$ 116. In addition, the controller 124 may modify the voltage of sensed output voltage $V_{OSENSE}$ 121 in response to the value of the line input voltage provided by the input voltage sense signal $U_{INSENSE}$ 130. The controller 124 outputs the drive signal 132 to operate the switch S1 110 in response to various system inputs to substantially regulate the output voltage $V_O$ 116. With resistors R1 118 and R2 120 along with the controller 124, the output of the power supply 100 is regulated in a closed loop. In embodiments of the present invention, resistors R1 118 and R2 120 along with controller 124 allows controller 124 to utilize a single terminal rather than the two or more separate terminals of conventional controllers for feedback and for setting the desired step-up ratio.

Figure 2:
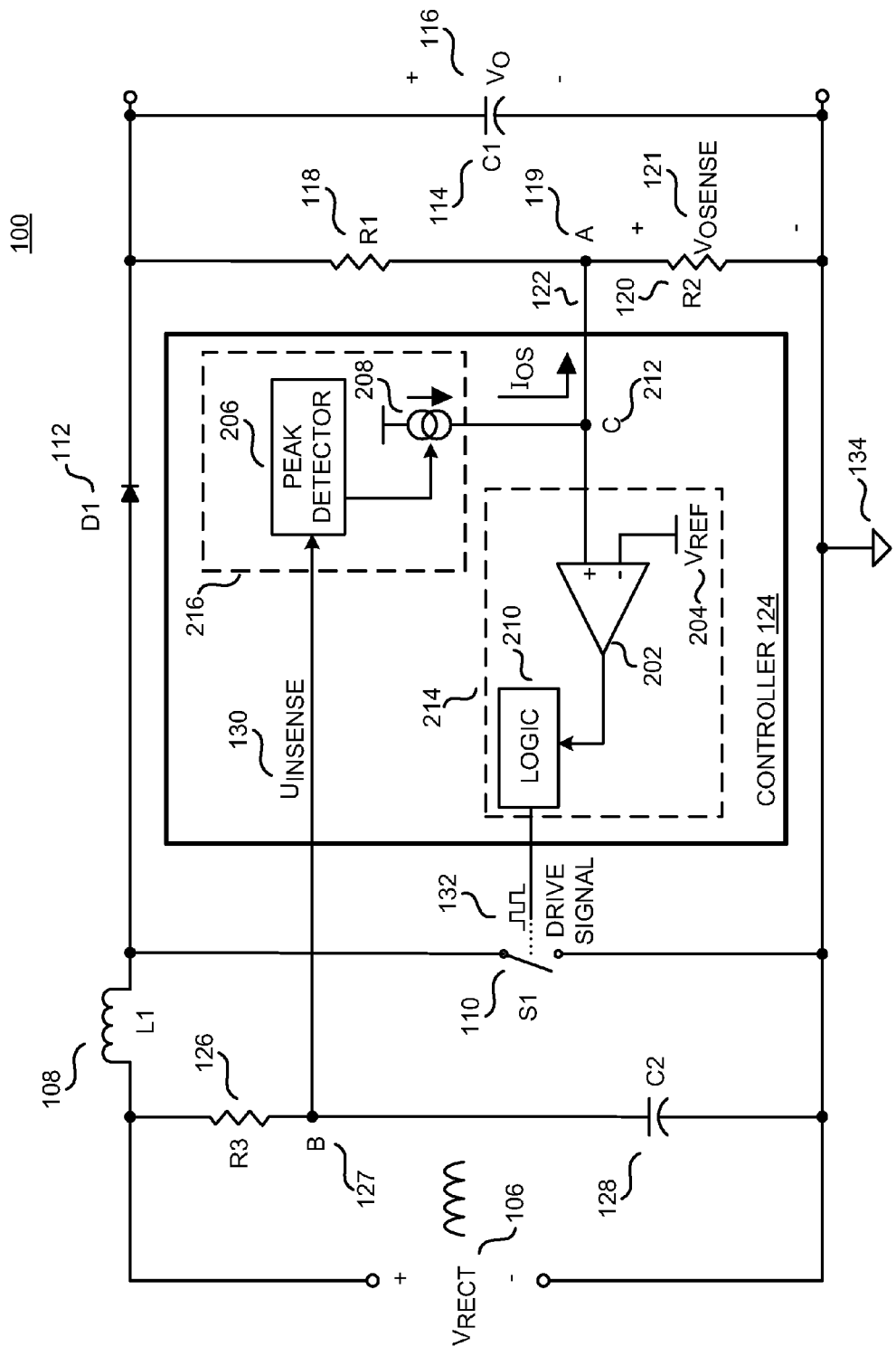
FIG. 2 is a schematic illustrating a controller of the power supply of FIG. 1 in accordance with an embodiment of the present invention.

Referring next to FIG. 2, a schematic of controller 124 of power supply 100 is illustrated including rectified voltage $V_{RECT}$ 106, inductor L1 108, switch S1 110, output diode D1 112, output capacitor C1 114, output voltage $V_O$ 116, a feedback circuit (i.e., resistor R1 118, node A 119, and resistor R2 120), input signal 122, controller 124, resistor R3 126, node B 127, capacitor C2 128, input voltage sense signal $U_{INSENSE}$ 130, drive signal 132, input return 134, a drive signal generator 214 (i.e., amplifier 202, reference voltage $V_{REF}$ 204, and logic block 210), a compensation circuit 216 (i.e., peak detector 206, current source 208 which produces offset current $I_{OS}$) and a node C 212.

Controller 124, rectified voltage $V_{RECT}$ 106, inductor L1 108, switch S1 110, output diode D1 112, output capacitor C1 114, output voltage $V_O$ 116, resistor R1 118, resistor R2 120, input signal 122, controller 124, resistor R3 126, capacitor C2 128, input voltage sense signal $U_{INSENSE}$ 130, drive signal 132, and input return 134 couple and function as discussed above with regards to FIG. 1. In addition, controller 124 further includes amplifier 202, reference voltage $V_{REF}$ 204, peak detector 206, current source 208 (which produces offset current $I_{OS}$), and logic block 210. Controller 124 receives input signal 122 and input voltage sense signal $U_{INSENSE}$ 130 as mentioned above. In one embodiment, the input signal 122 may provide the feedback signal for controller 124 to regulate the output voltage $V_O$ 116 of the power supply 100 to a desired quantity. However, it should be appreciated that controller 124 may also regulate an output current of the power supply 100 or a combination of both output current and output voltage $V_O$ 116. Amplifier 202 is coupled to the terminal of controller 124 which receives the input signal 122 and to the reference voltage $V_{REF}$ 204. In one embodiment, the non-inverting input of amplifier 202 is coupled at node A 119 and receives the input voltage signal 122. The reference voltage $V_{REF}$ 204 is coupled to the inverting input of amplifier 202. As illustrated, current source 208 also couples to the amplifier 202 at node C 212. As will be discussed further, the offset current $I_{OS}$ from current source 208 may modify the input signal 122. The amplifier 202 then receives the modified input signal 122. However, in one embodiment, the offset current $I_{OS}$ may be substantially equal to zero and the modified input signal 122 is the original input signal 122. The output of amplifier 202 further couples to the logic block 210. Utilizing the output of amplifier 202 and various other parameters, the logic block 210 outputs the drive signal 132 which operates the switch S1 110 to regulate the output voltage $V_O$ 116 to the desired value.

The peak detector 206 couples to the terminal of controller 124 which receives the input voltage sense signal $U_{INSENSE}$ 130. The peak detector 206 receives the input voltage sense signal $U_{INSENSE}$ 130 then couples to current source 208 with offset current $I_{OS}$. In one embodiment, the value of the offset current $I_{OS}$ is determined by the input voltage sense signal $U_{INSENSE}$ 130. Since the input voltage sense signal $U_{INSENSE}$ 130 is representative of the input voltage, the value of the offset current $I_{OS}$ may be determined by the input voltage. That is, the value of the offset current $I_{OS}$ may change in response to changes in the input voltage. As mentioned above, in some embodiments, the input voltage provided by the input voltage sense signal $U_{INSENSE}$ 130 is the peak value of the rectified voltage $V_{RECT}$ 106. In other embodiments, the input voltage provided by the input voltage sense signal $U_{INSENSE}$ 130 is the average value of the rectified voltage $V_{RECT}$ 106. In addition, the input voltage sense signal $U_{INSENSE}$ 130 may be a voltage signal or a current signal. Current source 208 further couples to the amplifier 202 at node C 212. In the example of FIG. 2, current source 208 couples to the non-inverting input of the amplifier 202. The offset current $I_{OS}$ produced by current source 208 flows from node C 212 to node A 119 illustrated in FIG. 2. Node C 212 is an internal node of controller 124 while node A 119 is an external node of controller 124. In general, an internal node lies within the integrated circuit (IC) of controller 124 while an external node lies outside of the IC of the controller 124. In other words, the offset current $I_{OS}$ produced by current source 208 flows from a node internal to controller 124 to a node which is external to controller 124. In the example shown in FIG. 2, node B 127 is an external node of controller 124.

Controller 124 utilizes the input signal 122, input voltage sense signal $U_{INSENSE}$ 130 and various other parameters to produce the drive signal 132 which operates switch S1 110. The drive signal 132 controls the turning on and turning off of the switch S1 110. In one example, the drive signal 132 may be a rectangular pulse waveform with varying lengths of logic high and logic low periods. With a logic high value corresponding to a closed switch and a logic low corresponding to an open switch. When the switch S1 110 is an n-channel MOSFET, the drive signal 132 may be analogous to the gate signal of a transistor with a logic high value corresponding to a closed switch and a logic low value corresponding to an open switch. In one embodiment, the switch S1 110 may be included within the IC of controller 124.

The controller 124 receives the input voltage sense signal $U_{INSENSE}$ 130 at the peak detector 206. As mentioned above, the input voltage sense signal $U_{INSENSE}$ 130 represents the input voltage of the power supply 100. In one embodiment, the input voltage sense signal $U_{INSENSE}$ 130 represents the rectified voltage $V_{RECT}$ 106 of power supply 100. Peak detector 206 determines the peak value of the input voltage of the power supply 100 from the input voltage sense signal $U_{INSENSE}$ 130. However, in some embodiments the detector 206 determines the average value of the input voltage of the power supply 100 from the input voltage sense signal $U_{INSENSE}$ 130. In one example, the input voltage sense signal $U_{INSENSE}$ 130 is a current signal. The current source 208 then receives the determined peak input voltage from the peak detector 206. In one embodiment, the peak detector refreshes and determines the peak value of rectified voltage $V_{RECT}$ 106 for every half cycle of the ac input voltage $V_{AC}$ 102. In other words, the peak detector determines the peak value of rectified voltage $V_{RECT}$ 106 at every peak. In one embodiment, the length of the half cycle of the ac input voltage $V_{AC}$ 102 is between 8 to 10 milliseconds (ms). Or in other words, the time between each peak of the rectified voltage $V_{RECT}$ 106 is about 8 to 10 ms. In addition, the peak detector has a programmed refreshed period which the peak detector is forced to refresh if a peak value has not been detected. In one embodiment, the programmed refresh period is substantially 15 ms.

Figure 3A:
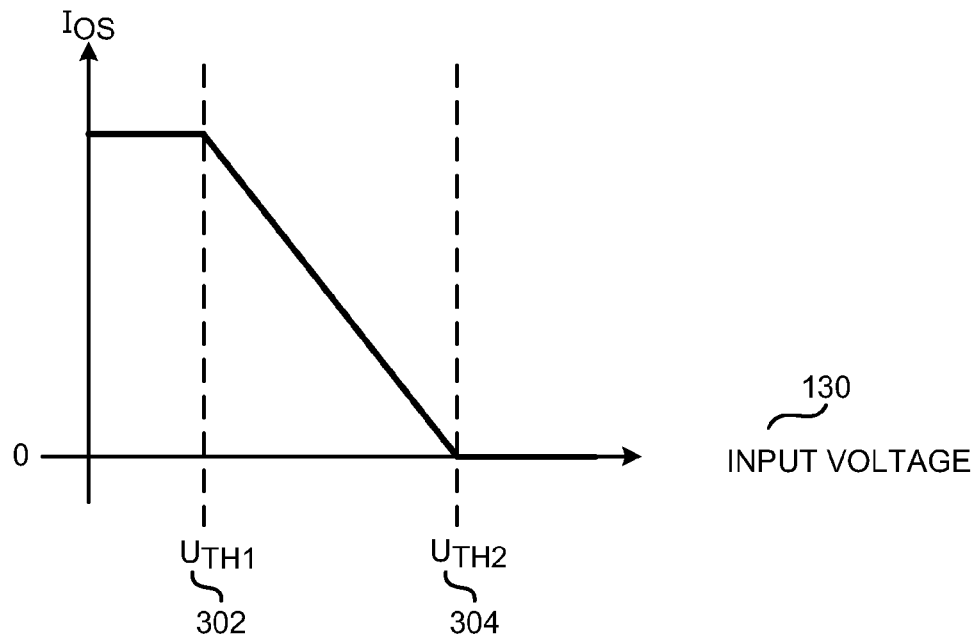
FIG. 3A is a graph illustrating an example offset current relationship of the controller of FIG. 2 in accordance with one embodiment of the present invention.
Figure 3B:
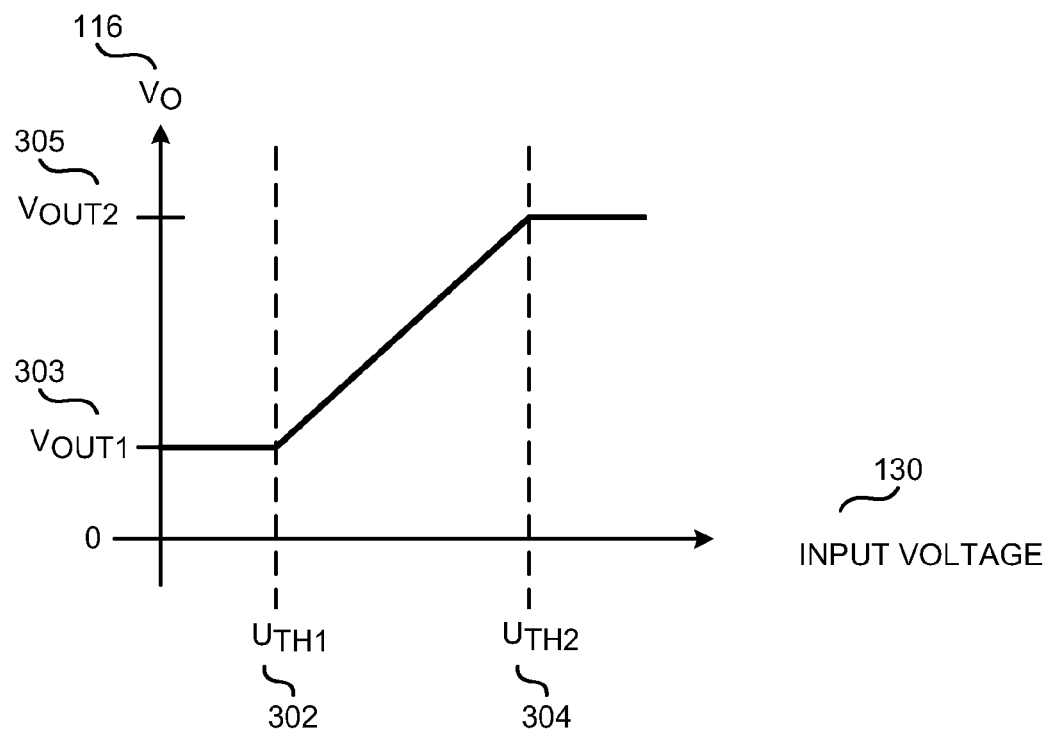
FIG. 3B is a graph illustrating an example output voltage to input voltage relationship of the power supply with the example offset current relationship of FIG. 3A in accordance with one embodiment of the present invention.
Figure 3C:
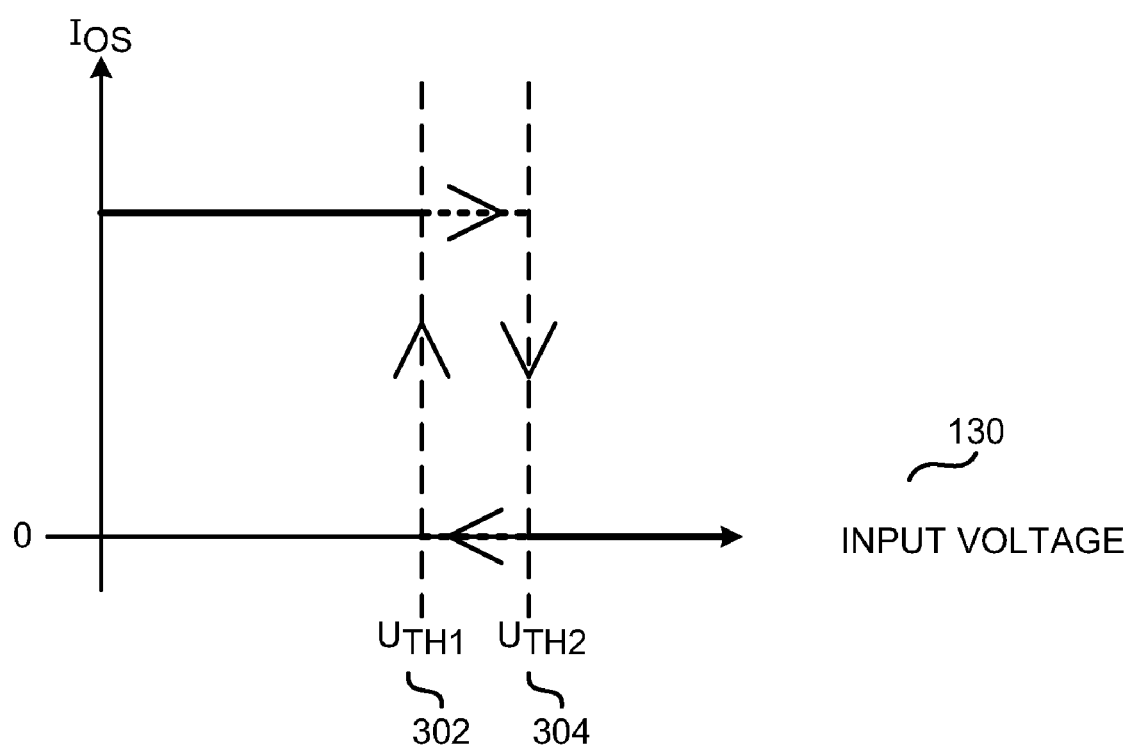
FIG. 3C is a graph illustrating another example offset current relationship of the controller of FIG. 2 in accordance with one embodiment of the present invention.
Figure 3D:
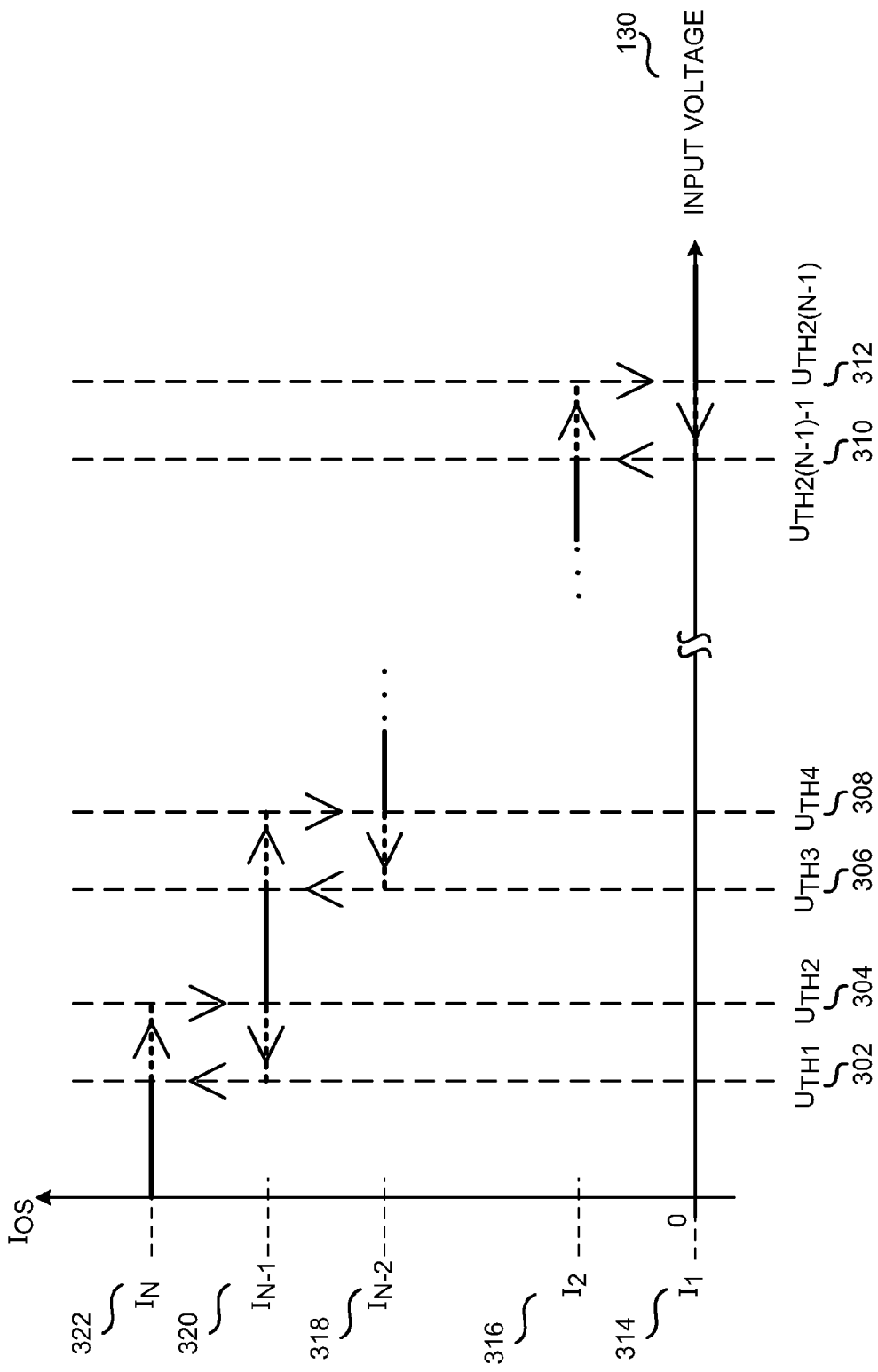
FIG. 3D is a graph illustrating a further example offset current relationship of the controller of FIG. 2 in accordance with one embodiment of the present invention.

As illustrated in FIGS. 3A, 3C and 3D, the current source 208 produces an offset current $I_{OS}$ from the value of the peak input voltage of the power supply 100 determined from the input voltage sense signal $U_{INSENSE}$ 130. In other embodiments, the current source 208 produces an offset current $I_{OS}$ from the value of the average value of the input voltage of the power supply 100 determined from the input voltage sense signal $U_{INSENSE}$ 130. In some embodiments, the current source 208 may be a voltage controller current source or a current controller current source.

The controller 124 also receives input signal 122. However, as mentioned above the input signal 122 may be modified by the offset current $I_{OS}$. The input signal 122 at node A (modified by the offset current $I_{OS}$, however the offset current $I_{OS}$ may be substantially equal to zero) is received by the amplifier 202 along with the reference voltage $V_{REF}$ 204. The amplifier 202 then outputs a value proportional to the difference between the input signal 122 at node A and the reference voltage $V_{REF}$ 204. In another embodiment, a comparator may replace amplifier 202 and outputs a logic high value or a logic low value depending on whether the input signal 122 at node A was greater or lesser than the reference voltage $V_{REF}$ 204. The output of the amplifier 202 is utilized by the logic block 210 to control the switch S1 110 and regulate the output voltage $V_O$ 116 of the power supply 100. In other words, the controller 124 regulates the output voltage $V_O$ 116 such that the output of the amplifier 202 is substantially zero, indicating that the input signal 122 at node A is substantially equal to the reference voltage $V_{REF}$ 204.

However, the controller 124 may adjust the value which the output voltage $V_O$ 116 is regulated to depending on the input voltage sense signal $U_{INSENSE}$ 130. As mentioned above, some benefits may be gained by utilizing a boost converter whose output voltage varies with the input voltage. The controller 124 adjusts the desired value which $V_O$ 116 is regulated to by adjusting the offset current $I_{OS}$ based on the sensed value of the input voltage provided by the input voltage sense signal $U_{INSENSE}$ 130. For example, the voltage at node A 119 or in other words sensed output voltage $V_{OSENSE}$ 121:

$$V_{OSENSE} = V_O \frac{R2}{R1+R2} + I_{OS} \frac{R2R1}{R1+R2} \qquad (1)$$

However, in general R1 is much greater than R2 and equation (1) can be approximated as:

$$V_{OSENSE} \approx V_O \frac{R2}{R1} + I_{OS} R2 \qquad (2)$$

The ratio between R1 118 and R2 120 determines how much the output voltage $V_O$ 116 is divided by. For example, if the ratio between R1 118 and R2 120 was 50 (R1 118 is 50 times greater than R2 120), then the output voltage $V_O$ 116 would be 50 times greater than the portion of the sensed output voltage $V_{OSENSE}$ 121 due to the output voltage $V_O$ 116. Or in other words, the output voltage $V_O$ 116 is 50 times greater than the sensed output voltage $V_{OSENSE}$ 121 of the input signal 122 prior to modification by the offset current $I_{OS}$. The input signal 122 may also be modified by the offset current $I_{OS}$. As shown in both equations (1) and (2), the sensed output voltage $V_{OSENSE}$ 121 is also partially determined by the offset current $I_{OS}$ and resistor R2 120. Utilizing the offset current $I_{OS}$, the controller 124 may vary the desired value which to regulate the output voltage $V_O$ 116 depending on the value of the input voltage provided by the input voltage sense signal $U_{INSENSE}$ 130. As mentioned above, the controller 124 regulates the power supply 100 such that the voltage at node A (also known as sensed output voltage $V_{OSENSE}$ 121) is substantially equal to the reference voltage $V_{REF}$ 204. When an offset current $I_{OS}$ increases, the controller 124 would regulate the power supply such that the output voltage $V_O$ 116 decreases until the sensed output voltage $V_{OSENSE}$ 121 at node A is substantially equal to the reference voltage $V_{REF}$ 204. From equation (2), the output voltage $V_O$ 116 is given by:

$$V_O \approx \frac{R1}{R2}(V_{OSENSE} - I_{OS} R2) \qquad (3)$$

As mentioned above, the controller 124 regulates the power supply 100 such that the sensed output voltage $V_{OSENSE}$ 121 is substantially equal to the reference voltage $V_{REF}$ 204. By substituting the reference voltage $V_{REF}$ 204 for the sensed output voltage $V_{OSENSE}$ 121, equation (3) may be rewritten as:

$$V_O \approx \frac{R1}{R2}(V_{REF} - I_{OS}R2) \quad (4)$$

As shown with equations (3) and (4), an increase in the offset current $I_{OS}$ results in a decrease in the output voltage $V_O$ 116. Since the offset current $I_{OS}$ is determined by the input voltage from the input voltage sense signal (as illustrated in FIGS. 3A, 3C and 3D), the output voltage $V_O$ 116 of power supply 100 varies with the input voltage. In addition, the values of R1 118 and R2 120 set the maximum output voltage $V_O$ 116 while the value of R2 120 sets the ratio between the input voltage and the output voltage $V_O$ 116. In one embodiment, the input voltage is the peak rectified voltage $V_{RECT}$ 106. In another embodiment, the input voltage is the average rectified voltage $V_{RECT}$ 106. By utilizing the offset current, controller 124 may utilize a single terminal to receive feedback and to set the step-up ratio of the controller.

Referring to FIG. 3A, a graph of the offset current $I_{OS}$ relationship of the controller 124 is illustrated including input voltage sense signal $U_{INSENSE}$ 130, offset current $I_{OS}$, a first input threshold $U_{TH1}$ 302, and a second input threshold $U_{TH2}$ 304.

When the value of the input voltage provided by the input voltage sense signal $U_{INSENSE}$ 130 is low, the offset current $I_{OS}$ is substantially a non-zero value. The offset current $I_{OS}$ is substantially a constant non-zero value until the value of the input voltage reaches the first input threshold $U_{TH1}$ 302. Once the value of the input voltage reaches the first input threshold $U_{TH1}$ 302, the offset current $I_{OS}$ begins to decrease. The offset current $I_{OS}$ decreases until the value of the input voltage reaches the second input threshold $U_{TH2}$ 304. When the value of the input voltage is greater than the second input threshold $U_{TH2}$ 304, the offset current $I_{OS}$ is substantially zero. In this example, the first input threshold $U_{TH1}$ 302 corresponds to a lower value of input voltage than the second input threshold $U_{TH2}$ 304.

In other words, when the value of the input voltage is between the first input threshold $U_{TH1}$ 302 and the second input threshold $U_{TH2}$ 304 the offset current $I_{OS}$ decreases as the value of the input voltage increases. In the example shown in FIG. 3A, the offset current $I_{OS}$ decreases substantially linearly with an increasing value of the input voltage. The offset current $I_{OS}$ is substantially zero when the value of the input voltage is greater than the second input threshold $U_{TH2}$ 304. The offset current $I_{OS}$ is at a substantially non-zero value when the value of the input voltage is less than the first input threshold $U_{TH1}$ 302.

Referring next to FIG. 3B, a graph illustrating an example output voltage to input voltage relationship of the power supply is illustrated including output voltage $V_O$ 116, input voltage sense signal $U_{INSENSE}$ 130, a first input threshold $U_{TH1}$ 302, a second input threshold $U_{TH2}$ 304, a first output voltage level $V_{OUT1}$ 303, and a second output voltage level $V_{OUT2}$ 305. The graph of FIG. 3B illustrates the output voltage $V_O$ 116 when the offset current $I_{OS}$ relationship of FIG. 3A is utilized.

When the value of the value input voltage provided by the input voltage sense signal $U_{INSENSE}$ 130 is low, the offset current $I_{OS}$ is substantially a constant non-zero value until the value of the input voltage reaches the first input threshold $U_{TH1}$ 302. While the value of the input voltage is less than the first input threshold $U_{TH1}$ 302, the output voltage $V_O$ 116 is also a substantially constant non-zero value of first output voltage level $V_{OUT1}$ 303. Once the value of the input voltage reaches the first input threshold $U_{TH1}$ 302, the offset current $I_{OS}$ begins to decrease until the value of the input voltage reaches the second input threshold $U_{TH2}$ 304. The output voltage $V_O$ 116 increases as the offset current $I_{OS}$ decreases when the input voltage is between the first input threshold $U_{TH1}$ 302 and the second input threshold $U_{TH2}$ 304. When the input voltage is greater than the second input threshold $U_{TH2}$ 304, the offset current $I_{OS}$ is substantially zero and the output voltage $V_O$ 116 is a substantially constant non-zero value of second output voltage level $V_{OUT2}$ 305. In one embodiment of the present invention, the first output voltage level $V_{OUT1}$ 303 corresponds to a lower value of the output voltage $V_O$ 116 than the second output voltage level $V_{OUT2}$ 305.

As discussed above, the relationship between the offset current $I_{OS}$ and the output voltage $V_O$ 116 is shown in equations (1), (2), (3) and (4). As shown in FIGS. 3A and 3B, as the offset $I_{OS}$ current decreases the output voltage $V_O$ 116 increases. As the offset current $I_{OS}$ increases the output voltage $V_O$ 116 will subsequently decrease. In the example shown in FIGS. 3A and 3B, the offset current $I_{OS}$ decreases substantially linearly and the output voltage $V_O$ 116 increases substantially linearly with an increasing value of the input voltage between the first input threshold $U_{TH1}$ 302 and the second input threshold $U_{TH2}$ 304.

Referring next to FIG. 3C, a graph of another example of the offset current $I_{OS}$ relationship of the controller 124 is illustrated including input voltage sense signal $U_{INSENSE}$ 130, offset current $I_{OS}$, a first input threshold $U_{TH1}$ 302, and a second input threshold $U_{TH2}$ 304. The graph of FIG. 3C illustrates the offset current $I_{OS}$ relationship with added hysteresis.

When the value of the input voltage provided by the input voltage sense signal $U_{INSENSE}$ 130 is less than the first input threshold $U_{TH1}$ 302, the offset current $I_{OS}$ is substantially a constant non-zero value. The offset current $I_{OS}$ is substantially zero when the value of the input voltage is greater than the second input threshold $U_{TH2}$ 304. For the offset current $I_{OS}$ to decrease from the substantially non-zero value to substantially zero, the value of the input voltage is greater than or substantially equal to the second input threshold $U_{TH2}$ 304. However for the offset current $I_{OS}$ to increase from the substantially zero value to substantially non-zero, the value of the input voltage is less than or substantially equal to the first threshold input $U_{TH1}$ 302. In the example of FIG. 3C, the first input threshold $U_{TH1}$ 302 corresponds to a lower value of input voltage than the second input threshold $U_{TH2}$ 304. By adding hysteresis to the relationship between the offset current $I_{OS}$ and the value of the input voltage, power supply 100 accounts for fluctuations in the input voltage due to other factors such as noise.

FIG. 3D is a graph of a further example offset current $I_{OS}$ relationship of the controller 124 is illustrated including input voltage sense signal $U_{INSENSE}$ 130, offset current $I_{OS}$, input thresholds $U_{TH1}$ 302 to $U_{TH2(N-1)}$ 312, and offset current levels $I_1$ 314 to $I_N$ 322. FIG. 3D illustrates the offset current $I_{OS}$ relationship with hysteresis and multiple offset current levels.

As discussed above, FIG. 3C illustrated the offset current $I_{OS}$ relationship with added hysteresis for two offset current levels of a constant non-zero value and a substantially zero value. FIG. 3D further illustrates the offset current $I_{OS}$ relationship with added hysteresis for N offset current levels $I_1$ 314, $I_2$ 316 to $I_{N-2}$ 318, $I_{N-1}$ 320, and $I_N$ 322. In the example shown in FIG. 3D, the current level $I_1$ 314 is substantially zero while current levels $I_2$ 316 to $I_{N-2}$ 318, $I_{N-1}$ 320, and $I_N$ 322 are substantially non-zero values where the next current level is greater than the previous current level. Or in other words, the value of current level $I_N$ 322 is greater than the value of current level $I_{N-1}$ 320 which is greater than the value of current level $I_{N-2}$ 318 and so on until the substantially zero value of current level $I_1$ 314. For N offset current levels, there are 2(N−1) input thresholds. These input thresholds are shown in FIG. 3D as $U_{TH1}$ 302, $U_{TH2}$ 304, $U_{TH3}$ 306, $U_{TH4}$ 308, $U_{TH2(N-1)-1}$ 310 and $U_{TH2(N-1)}$ 312. Input thresholds $U_{TH1}$ 302, $U_{TH2}$ 304, $U_{TH3}$ 306, $U_{TH4}$ 308, $U_{TH2(N-1)-1}$ 310 and $U_{TH2(N-1)}$ 312 are substantially non-zero values with the next input threshold being greater than the previous input threshold. Or in other words, input threshold $U_{TH2(N-1)}$ 312 is greater than input threshold $U_{TH2(N-1)-1}$ 310 and so on until the first input threshold $U_{TH1}$ 302.

When the value of the input voltage provided by the input voltage sense signal $U_{INSENSE}$ 130 is less than the first input threshold $U_{TH1}$ 302, the offset current $I_{OS}$ is substantially a constant non-zero value of current level $I_N$ 322. The offset current $I_{OS}$ is substantially a constant non-zero value of current level $I_{N-1}$ 320 when the value of the input voltage is greater than the second input threshold $U_{TH2}$ 304 and less than the third input voltage vale $U_{TH3}$ 306. For the offset current $I_{OS}$ to decrease from the substantially non-zero value of current level $I_N$ 322 to the substantially constant non-zero value of current level $I_{N-1}$ 320, the value of the input voltage is greater than or substantially equal to the second input threshold $U_{TH2}$ 304. However for the offset current $I_{OS}$ to increase from the substantially constant non-zero value of current level $I_{N-1}$ 320 to the substantially non-zero value of current level $I_N$ 322, the value of the input voltage is less than or substantially equal to the first threshold input $U_{TH1}$ 302. The pattern for the transitions from one offset current level to another repeats until the transition between the non-zero value of current level $I_2$ 316 and the substantially zero value of current level $I_1$ 314. When the value of the input voltage provided by the input voltage sense signal $U_{INSENSE}$ 130 is greater than input threshold $U_{TH2(N-1)}$ 312, the offset current $I_{OS}$ is substantially zero at current level $I_1$ 314.

While the invention herein disclosed has been described by means of specific embodiments, examples and applications thereof, numerous modifications and variations could be made thereto by those skilled in the art without departing from the scope of the invention set forth in the claims.

What is claimed is:

1. A controller for a power supply, the controller comprising:
    a drive signal generator to be coupled to provide a drive signal to control switching of a switch included in the power supply to regulate an output voltage of the power supply in response to a sensed output voltage such that the output voltage of the power supply is greater than an input voltage of the power supply; and
    a compensation circuit coupled to the drive signal generator and coupled to output an offset current to adjust the sensed output voltage in response to the input voltage of the power supply, wherein the compensation circuit is adapted to decrease the offset current in response to increases in the input voltage.

2. The controller of claim 1, wherein the switch and the controller are integrated into a single monolithic integrated device.

3. The controller of claim 1, wherein the offset current linearly decreases in response to increases in the input voltage.

4. The controller of claim 1, wherein the offset current is a constant non-zero value when the input voltage is less than a first input threshold and wherein the offset current decreases in response to increases in the input voltage when the input voltage is greater than or equal to the first input threshold.

5. The controller of claim 1, wherein the offset current decreases in response to increases in the input voltage when the input voltage is less than a second input threshold and wherein the offset current is substantially zero when the input voltage is greater than or equal to the second input threshold.

6. The controller of claim 1, wherein the offset current is substantially zero until the input voltage decreases to a first input threshold, and wherein the offset current is a substantially constant non-zero value until the input voltage increases to a second input threshold wherein the second input threshold is greater than the first input threshold.

7. A controller for a power supply, the controller comprising:
    a drive signal generator including:
        an amplifier to be coupled to receive a sensed output voltage; and
        a logic circuit coupled to the amplifier and to be coupled to provide a drive signal to control switching of a switch included in the power supply to regulate an output voltage of the power supply in response to the amplifier such that the output voltage of the power supply is greater than an input voltage of the power supply; and
    a compensation circuit coupled to the drive signal generator, wherein the compensation circuit includes a current source to be coupled to output an offset current to adjust the sensed output voltage in response to the input voltage of the power supply, wherein the compensation circuit further includes a peak detector coupled to the current source and to be coupled to receive an input voltage sense signal representative of the input voltage of the power supply.

8. The controller of claim 7, wherein the switch and the controller are integrated into a single monolithic integrated device.

9. The controller of claim 7, wherein the offset current is substantially zero until the input voltage decreases to a first input threshold, and wherein the offset current is a substantially constant non-zero value until the input voltage increases to a second input threshold wherein the second input threshold is greater than the first input threshold.

10. The controller of claim 7, wherein the peak detector is adapted to determine a peak voltage of the input voltage of the power supply from the input voltage sense signal.

11. The controller of claim 7, wherein the peak detector is adapted to determine an average voltage of the input voltage of the power supply from the input voltage sense signal.

12. The controller of claim 7, wherein the input voltage sense signal is a current representative of the input voltage of the power supply.

13. The controller of claim 7, wherein the current source is adapted to decrease the offset current in response to increases in the input voltage.

14. The controller of claim 13, wherein the offset current linearly decreases in response to increases in the input voltage.

15. The controller of claim 7, wherein the offset current is a constant non-zero value when the input voltage is less than a first input threshold and wherein the offset current decreases in response to increases in the input voltage when the input voltage is greater than or equal to the first input threshold.

16. The controller of claim 7, wherein the offset current decreases in response to increases in the input voltage when the input voltage is less than a second input threshold and wherein the offset current is substantially zero when the input voltage is greater than or equal to the second input threshold.

17. The controller of claim 7, further comprising a reference voltage coupled to the amplifier, wherein the logic circuit is configured to regulate the output voltage such that the sensed output voltage is substantially equal to the reference voltage.

18. The controller of claim 17, wherein the amplifier is a comparator, and wherein the comparator is coupled to provides a logic signal to the logic circuit indicating whether the sensed output voltage is greater than or less than the reference voltage.

19. The controller of claim 17, wherein the amplifier is coupled to provide a signal to the logic circuit that is proportional to the difference between the sensed output voltage and the reference voltage.

20. A power supply, comprising:
a feedback circuit coupled to provide a sensed output voltage representative of an output voltage of the power supply;
a controller coupled to the feedback circuit, the controller including:
a drive signal generator coupled to control switching of a switch included in the power supply to regulate the output voltage of the power supply in response to the sensed output voltage such that the output voltage of the power supply is greater than an input voltage of the power supply; and
a compensation circuit coupled to the drive signal generator and coupled to output an offset current to the feedback circuit to adjust the sensed output voltage in response to the input voltage of the power supply,
wherein the compensation circuit is adapted to decrease the offset current in response to increases in the input voltage and to increase the offset current in response to decreases in the input voltage.

21. The power supply of claim 20, wherein the offset current is substantially zero until the input voltage decreases to a first input threshold, and wherein the offset current is a substantially constant non-zero value until the input voltage increases to a second input threshold wherein the second input threshold is greater than the first input threshold.

22. The power supply of claim 20, wherein the offset current decreases in response to increases in the input voltage when the input voltage is less than a second input threshold and wherein the offset current is substantially zero when the input voltage is greater than or equal to the second input threshold.

23. The power supply of claim 20, wherein the feedback circuit further includes:
a node external to the controller and coupled to the compensation circuit and coupled to the drive signal generator;
a first resistance coupled to the node; and
a second resistance coupled to the node, wherein the sensed output voltage is a voltage at the node with respect to an input return of the power supply.

24. The power supply of claim 20, wherein the offset current is a constant non-zero value when the input voltage is less than a first input threshold and wherein the offset current decreases in response to increases in the input voltage when the input voltage is greater than or equal to the first input threshold.

* * * * *